No. 652,123. P. G. LAVIGNE. Patented June 19, 1900.
SCREW PROPELLER.
(Application filed Sept. 14, 1899.)
(No Model.) 2 Sheets—Sheet 2.
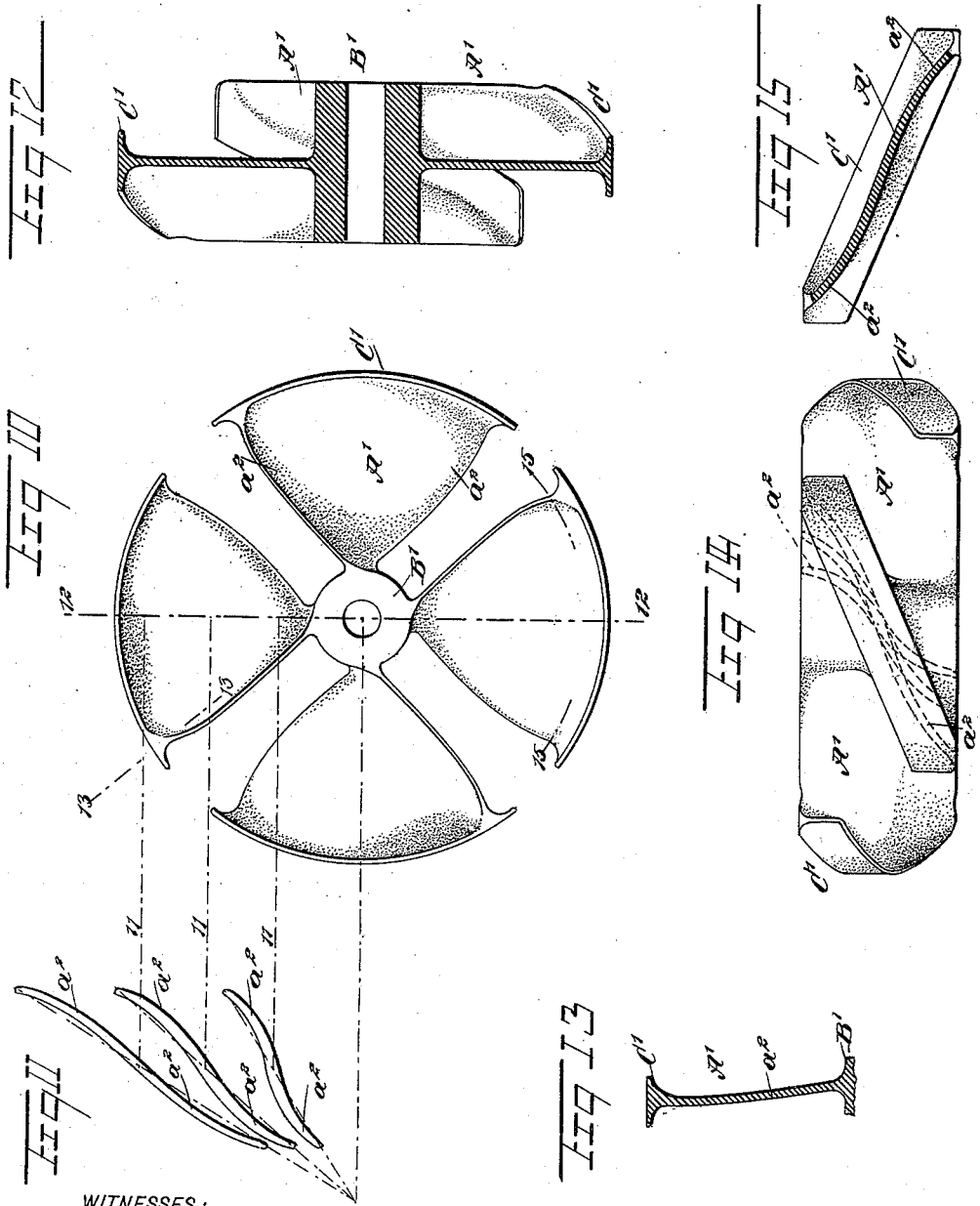

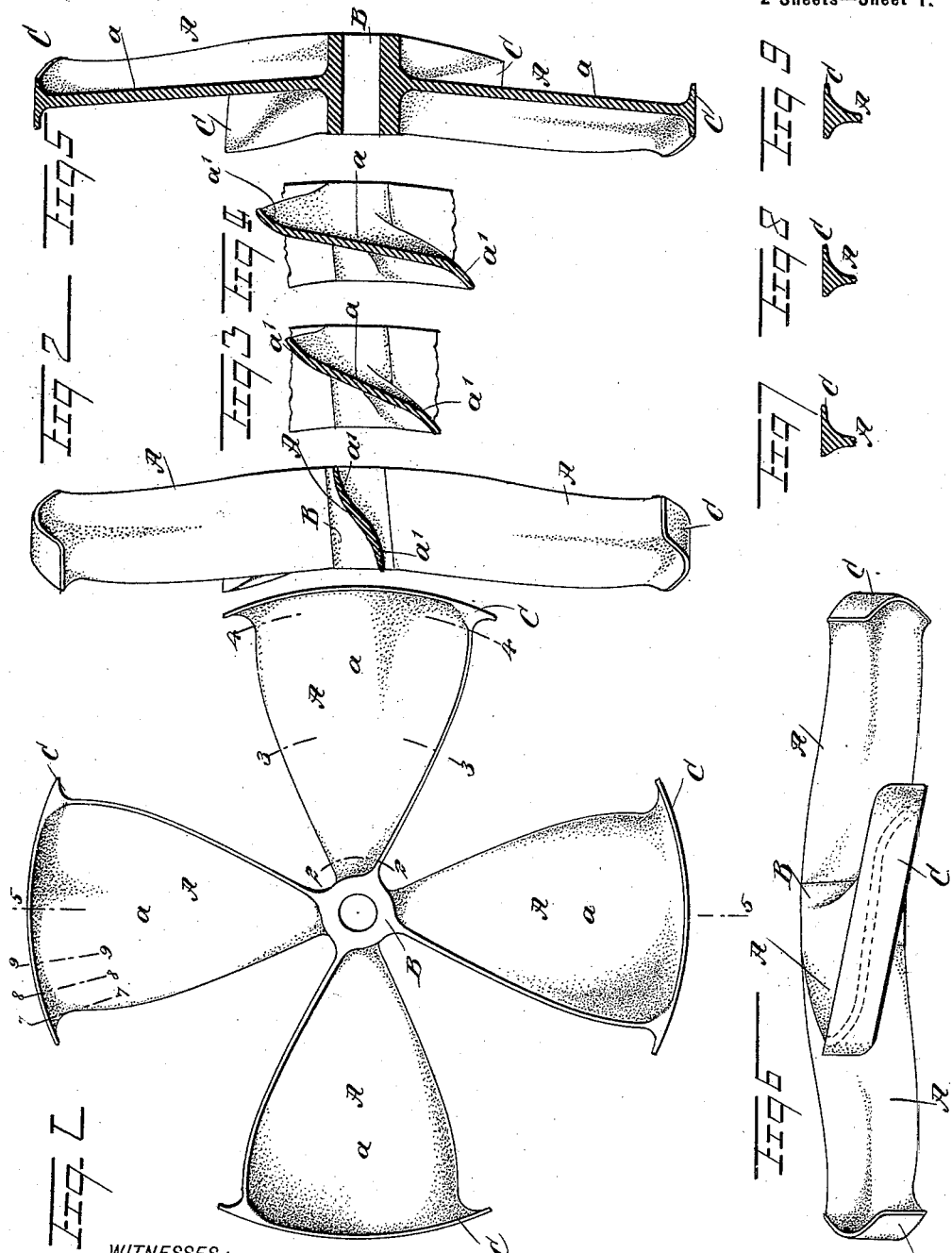

UNITED STATES PATENT OFFICE.

PETER GODFROY LAVIGNE, OF NAPA, CALIFORNIA.

SCREW-PROPELLER.

SPECIFICATION forming part of Letters Patent No. 652,123, dated June 19, 1900.

Application filed September 14, 1899. Serial No. 730,441. (No model.)

*To all whom it may concern:*

Be it known that I, PETER GODFROY LAVIGNE, of Napa, in the county of Napa and State of California, have invented new and useful Improvements in Marine Propellers, of which the following is a full, clear, and exact description.

This invention relates to a marine propeller of the screw class, the invention involving certain peculiarities of formation by means of which more effective results are produced than those heretofore attained.

This invention is the disclosure of two forms of my invention, while the claims define the actual scope thereof.

Reference is to be had to the accompanying drawings, forming a part of this specification, in which similar characters of reference indicate corresponding parts in all the views.

Figure 1 is a face view of one form of the propeller. Fig. 2 is an edge view, with one blade in section, on the line 2 2 of Fig. 1. Fig. 3 is a section of one of the blades on the line 3 3 of Fig. 1. Fig. 4 is a section of one of the blades on the line 4 4 of Fig. 1. Fig. 5 is a section through the propeller on the line 5 5 of Fig. 1. Fig. 6 is an edge view of the propeller-wheel, showing the pitch of one of the blades at the outer end thereof in dotted lines. Fig. 7 is a fragmentary section on the line 7 7 of Fig. 1. Fig. 8 is a similar view on the line 8 8 of Fig. 1. Fig. 9 is a similar view on the line 9 9 of Fig. 1. Fig. 10 is a face view of a modified form of the propeller. Fig. 11 is a diagrammatic view showing the varying pitch of the blades, the diagrams indicating the pitch, respectively, at the lines 11, Figs. 10 and 11. Fig. 12 is a sectional view on the line 12 12 of Fig. 10. Fig. 13 is a sectional view on the line 13 13 of Fig. 10, the view extending to the hub of the wheel. Fig. 14 is an edge view of the wheel, with the varying pitch of one blade indicated by dotted lines, such dotted lines corresponding with the diagrams of Fig. 11; and Fig. 15 is a sectional view on the line 15 15 of Fig. 10.

Referring to the first nine figures, the propeller, which may have any desired number of blades, is shown as constructed with four blades A, joined to a hub B and having their outer edges bounded by ribs C, which are formed integral with the blades or otherwise secured thereto. The blades A are pitched so that the wheel drives ahead by movement from right to left, which, as will be understood, is the reverse of the usual arrangement. This feature is not essential, however, since the wheel may be made to drive by turning in either direction. Each blade A has its width at the inner portion equal to the length of the hub, as may be seen best in Fig. 2, and the blades are joined to the hub on lines slightly oblique to the axis of the hub, as Fig. 2 also shows. From the hub the blades extend outward and are turned spirally to give them the pitch illustrated, which decreases outward toward the rim of the wheel. Figs. 2, 3, and 4 illustrate this gradual decrease in the pitch of the blades. Each blade in section, as illustrated in Figs. 2, 3, and 4 and also by the dotted lines in Fig. 6, defines a double curve, or, in other words, the curve of a natural S, the pitch of which curve is greater at its end portions than at its middle. The preservation of this S shape results in the formation in each blade at the center of the outer portion thereof of an approximately-plane portion $a$, each side edge of which is bounded by an abruptly-curved portion $a'$, which curved parts $a'$ are disposed oppositely to produce the S shape referred to and continued inward to the hub B, as may be seen by reference to Fig. 2. Reference to Figs. 2, 3, and 4 will show that the blades at all points of their length are formed with double curves, which have at their end portions (at the edges of the blades) greater pitch with respect to the axis of the wheel than at their middle and that this construction is not affected by the plane portions $a$ mentioned above. This is the essential feature of my invention—viz., the double curve in the blade of such form as to give the edges of the blade greater pitch or angularity with respect to the axis of the wheel than the middle portion of the blade. The rim C of each blade is located at the outer edge thereof, which edge is curved in conformity with the imaginary periphery of the propeller-wheel, and each rim C has its inner or under face beveled or curved (see Figs. 7, 8, and 9) in conformity with the curvature of the faces of the blade, so that the surfaces of the blade will be graduated to the front edge of the rims C without the intervention of an abrupt curve or angle. Referring particularly to Figs. 3 and 4, it will be seen that each face of the blade has a convexedly-curved surface, an approximately-plane middle surface, and a concavedly-curved surface opposite the convexedly-curved surface. Now the rim C at the side adjacent to this surface of the blade referred to is curved so as to form at all points a regularly and uniformly curved surface leading out to the adjacent edge of the rim. The lines 7 7, 8 8, and 9 9 in Fig. 1, showing the points of section at Figs. 7, 8, and 9, will illustrate this construction. Thus it will be seen that at the right of Fig. 7 the rim C overhangs the blade A considerably more than at the left, in Fig. 8 the overhang at the left is a little greater than that in Fig. 7, and in Fig. 9 the overhang at the left is almost equal to the overhang at the right. With such a construction the wheel in turning through the water from right to left will act on the water to drive the vessel more effectively than wheels of other construction. Considering each blade individually, its action on the water is essentially as follows: The convex surface at the front edge of the rear or acting face of the blade first engages the water and gives the wheel a forward impulse. As the wheel continues through the water the plane portion A of the blade at the outer part thereof engages the water and is of less pitch than the convex surface at the front edge of the blade, but still being disposed diagonally to the axis of the wheel acts on the water in addition. Then as the wheel continues still farther the concave portion of the blade at its near edge, opposite the convex portion before referred to, acts on the water and gives a third impulse to the wheel. It will thus be seen that each blade has three acting surfaces on its working face and that each of these surfaces gives a distinctive impulse to the wheel, thus producing a blade with greater power and one which will drive ahead or astern with equal facility. The rim C, turning with the blade, prevents the centrifugal action of the water, and the rim being curved in conformity with the curvature of the blade produces an absolute evenness of action and prevents suction or eddies in the wake of the blade.

The form of the invention illustrated in Figs. 10 to 15 involves a blade relatively wider and shorter than the blade above described, at the same time employing a hub of comparatively the same axial length. In these figures the hub B' carries the blades A', which are shown as four in number, but which may be of any desired number, and each of which carries the peripheral rim C'. The blades in this form of my invention are of a width at their inner ends equal to the length of the hub and are secured to the hub on a line parallel or approximately parallel with the axis of the hub. From the inner ends of the blades they extend outward with gradually-decreasing pitch, as indicated by the diagrams in Fig. 11, the three subdivisions of which figure show the pitch of the blade, respectively, at the three points indicated by the lines 11, extending between Figs. 10 and 11. The blades in cross-section each describes a reverse curve; but in this form of the invention the wheel is shown as adapted to turn from left to right to drive the screw ahead, or, in other words, the screw is natural. It will be observed that the same S shape is preserved throughout the length of each blade; but this S shape is reversed with respect to that shown in Figs. 1 to 9. The preservation of the S shape in Figs. 10 to 15 results in the formation at each face of the blade of an abruptly-curved surface $a^2$, which surfaces are oppositely curved, as indicated; but the blade of Figs. 10 to 15 is distinguished from the blade in the other figures in that the approximately-plane intermediate portion is not present in Figs. 10 to 15, the curves $a^2$ of each blade running gradually into each other, as indicated. Notwithstanding this the edge portions of the blades lie at more acute angles to the axis of the wheel than the middle portions, or, in other words, the pitch of the edges of the blades is greater than that at their middles, as before explained. The rims C' are of the same construction as the rims C— that is to say, the inner or under surfaces of the edges are beveled and curved uniformly with the curvature of the blades, which, it must be understood, varies at different points, as indicated by full lines in Figs. 11 and 15 and the dotted lines in Fig. 14. Fig. 12, showing sections through the centers of two blades, shows the radial centers of the blades as straight. This is also indicated by the dotted lines in Fig. 14. Fig. 13, however, being a section at one edge of one blade, shows a slight curvature, which further illustrates the curved portions $a^2$, previously described. The action of this blade on the water is essentially the same as that previously described, the difference in the two forms of the propeller being simply in proportion; but it must be understood that when the proportions are changed in the manner shown in the drawings certain minor changes in structure are involved, which changes are those described above.

By the improved form of blade two points of gain are at once apparent—first, that as compared with the ordinary wheel of the same diameter and length of hub a much greater surface area of blade, and hence of propelling power, is gained, and, second, such power is further increased by the varying pitch of the blade, it being extreme on the edge which first takes hold of the water, and yet being so limited in surface area that churning is almost entirely obviated. This result is due to the principle of securing the necessary pitch by the conformation of the blade independent of the angle which the blade makes with the axial line of the hub.

To obviate the loss by slip, the rim shown is combined with such improved blade in order to overcome to some extent the centrifugal effect of the revolving wheel. By this an opportunity is given for the exercise of the power applied on a body of water that is thus, for an instant and before it escapes past the rim, almost solid. By this, too, the body of water affected by the wheel and from which the forward impetus must be derived is much increased, as can be readily seen from a comparison of the respective types. The entire body of water against the under surfaces is for an instant made an efficient factor in producing a forward impetus, while with the ordinary wheel a considerable portion of it at once slips or slides by the end of the blade without imparting pressure to it.

Having thus described my invention, I claim as new and desire to secure by Letters Patent—

1. A propeller-wheel, having a blade formed with a double curve extending longitudinally of the blade and giving the edge portions of the blade greater pitch or angularity with respect to the axis of the wheel than the middle portion of the blade.

2. A propeller-wheel, having a blade formed with a double curve extending longitudinally thereof, such curve giving the edge portions of the blade greater pitch or angularity with respect to the axis of the wheel than the middle portion of the blade, and a rim disposed peripherally of the wheel and carried on the outer end of the blade, such rim having curved inner side walls which run gradually into the curvatures of the surfaces of the blade at its outer end.

PETER GODFROY LAVIGNE.

Witnesses:
H. M. BARSTOW,
PERCY S. KING.